United States Patent [19]

Toll et al.

[11] 4,389,194

[45] Jun. 21, 1983

[54] ELECTRONIC APPARATUS FOR TEACHING MATHEMATICS

[76] Inventors: Alexander R. Toll, 1348 Pennwood Rd., Philadelphia, Pa. 19151; Roland R. Gibboni, 660 Meadow Brook Ave., Ambler, Pa. 19002

[21] Appl. No.: 341,444

[22] Filed: Jan. 21, 1982

[51] Int. Cl.³ .............................................. G09B 19/02
[52] U.S. Cl. .......................................... 434/201; 46/2; 109/1 R; 434/332; 434/387
[58] Field of Search .............. 434/201, 258, 259, 260, 434/332, 387; 109/1 R, 23, 45; 46/2

[56] References Cited

U.S. PATENT DOCUMENTS

| | | | |
|---|---|---|---|
| 2,742,713 | 4/1956 | Villanueva | 434/332 |
| 3,829,989 | 8/1974 | Pecoraro | 434/332 X |
| 3,854,226 | 12/1974 | Divine et al. | 434/201 |
| 4,232,474 | 11/1980 | Dyer | 46/2 |

Primary Examiner—William H. Grieb
Attorney, Agent, or Firm—Robert S. Lipton; Arthur E. Oaks

[57] ABSTRACT

An electronic teaching device for teaching addition and subtraction to students in the primary grades. The device is of simple construction utilizing digital electronic components. The invention utilizes an enclosure or box which invites students to use the device as a toy or game while facilitating learning of simple mathematical tables. In the preferred embodiment the student gains access to the box, and a reward, which may be placed inside it, if he correctly completes a simple algebraic equation which had previously been setup by a teacher.

10 Claims, 3 Drawing Figures

ELECTRONIC APPARATUS FOR TEACHING MATHEMATICS

BACKGROUND OF THE INVENTION

1. Field of the Invention

This invention relates to teaching aids and devices which are intended for use by pre-school and primary grade students in developing number skills with simple integers; specifically, addition and subtraction.

2. Description of the Prior Art

Many different electronic teaching aids have appeared on the market in the last decade. The large majority of these devices have been aimed at teaching mathematics by providing active feedback to a student in response to an input by that student. With the advent of microminiature electronics, computerized teaching machines have become more and more complex, rendering some of them difficult to use, and expensive. Many of the machines existing today do not appeal to students who do not have some basic incentive to investigate mathematics.

A typical design of present machines being used in mathematical teaching devices is described in U.S. Pat. No. 3,854,226, issued to Divine on Dec. 17, 1974. This device, although a functioning teaching aid, ignores the basic problem of providing to a student incentive to use it. The present day devices amount to electronic calculators which utilize a light or buzzer to indicate a correct answer.

SUMMARY OF THE INVENTION

The principle of the subject invention is to incorporate a realm of familiarity with an electronic calculating device to create a teaching aid. Experience has shown that primary students are more likely to be attracted to a learning aid if that aid resembles or relates to something familiar in their environment. Educators commonly refer to this as experiencial learning.

In the preferred embodiment, a digital adder with a comparator and numerically labeled thumbwheel switches are combined with an enclosure resembling a bank vault to provide a unique function. The digital switches are aligned on the face of the vault in such a manner as to form a simple algebraic equation. When the numbers represented by the digital switches provide a numerically correct equation, a latching mechanism holding the vault door locked will be released as an indication of a correct answer. It is contemplated that a reward will be placed inside the vault as an inducement.

The operation of the invention would be as follows. A student would attempt to open the vault to obtain whatever may be placed within it; the door to the vault would be locked. The student would then attempt to gain access to the vault by entering a numeral in an algebraic expression on the face of the vault utilizing a series of thumbwheel number switches. Other given numerals would have been entered by the teacher. If the student enters the correct numeral which would cause the algebraic expression to be correct, the latch which controls the access to the vault door is released. The student has accomplished his goal by utilizing mathematics. This real world application of simple mathematics will serve as reenforcement for the primary grade-level student to explore the subject further.

OBJECT OF THE INVENTION

It is an object of the present invention to aid in the teaching of mathematics to primary students.

Another object of the present invention is to provide an apparatus to be used in the teaching of mathematics which provide an incentive to the student.

It is another object of the present invention to provide an aid in the teaching of mathematics which gives the student a positive indication that an algebraic equation has been completed correctly.

It is another object of the invention to provide an apparatus to be used in the teaching of mathematics which provides an incentive to a student to correctly complete an algebraic equation.

It is still another object of the present invention to provide a container to be used in the teaching of mathematics which permits access to its interior when a student has correctly completed an algebraic equation.

It is a further object of the invention to provide an apparatus to aid in the teaching of mathematics which includes a vault having a latch which automatically unlocks when a student has correctly completed an algebraic equation using digital switches which are connected, through appropriate circuitry, to the latch.

Further objects and advantages of the present invention will be described in the description which follows, taken together with the accompanying drawings in which like numerals refer to like parts.

DESCRIPTION OF THE PREFERRED EMBODIMENT

Figure 1:
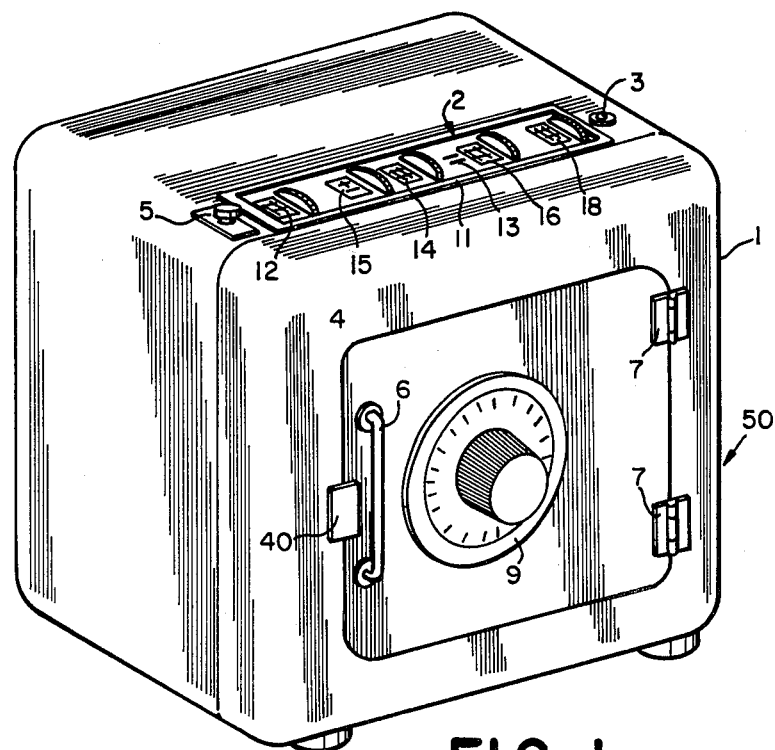
FIG. 1 is a perspective view of the teaching device of the present invention showing the preferred embodiment.

The preferred embodiment of the teaching device 50 is shown in FIG. 1. The housing 1 represents a safe or vault commonly utilized to store valuables. The housing 1 has an access door 4 which allows access to the interior compartment. Hinges 7 allow the door 4 to open. A handle 6 is provided to facilitate its opening. Latch 40 is provided to prevent opening of door 4 until a predetermined event occurs. Such an event, in the present embodiment, is the correct insertion of three numbers in an algebraic expression utilizing the thumbwheel switches in assembly 2. These thumbwheel switches consist of four switches 12, 14, 16 and 18 which can each represent a single digit number. Switch 15 is used to insert either an addition or subtraction sign between switches 12 and 14. All the above switches are contained in face plate 11. To complete the algebraic equation with the switches in assembly 2, an equal sign 13 is provided.

When a correct mathematical expression has been entered via the switches in assembly 2, a momentary contact switch 5 is depressed to release the latch 40. Depression of switch 5 will not release latch 40 if an incorrect expression has been entered in the equation format. Also, a lamp 3 is provided to indicate when latch 40 has been released. To provide a realistic atmosphere, a bank safe combination dial 9 is included on door 4, although it does not function to open the door 4.

As shown in FIG. 1, the algebraic expression in assembly 2 consists of two single integer numbers which are either added or subtracted and which will equal a third number represented by switches 16 and 18. Two switches are needed for the third number as two integers may be needed when the numerals represented by switches 12 and 14 are added. This simple algebraic equation lends itself to the teaching of mathematics in the lower primary grades. It is contemplated that other equations using multiplication, division or numerals with additional integers may be provided for higher levels of education.

Figure 2:
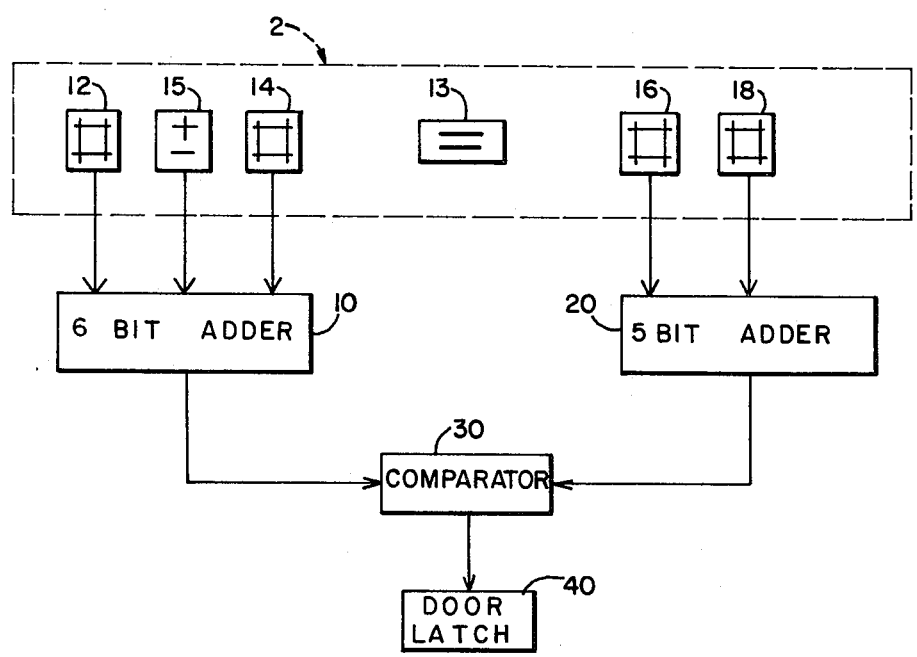
FIG. 2 is a block diagram of the electronic logic system within the device.

Turning now to the specific operation of the internal electronics, FIG. 2 shows a block diagram of the logic connected to the thumbwheel switches in assembly 2. The first six bit adder 10 combines the number values entered by switches 12 and 14. Switch 15 is used to indicate either an addition or subtraction operation to the six bit adder 10. Five bit adder 20 combines the two values indicated by switches 16 and 18 to form a one or two digit number. The values provided by six bit adder 10 and five bit adder 20 are compared in comparator 30. Comparator 30 determines whether the value of adders 10 and 20 are equal. If so, the comparator 30 energizes the latch 40 which permits the opening of the access door 4.

Figure 3:
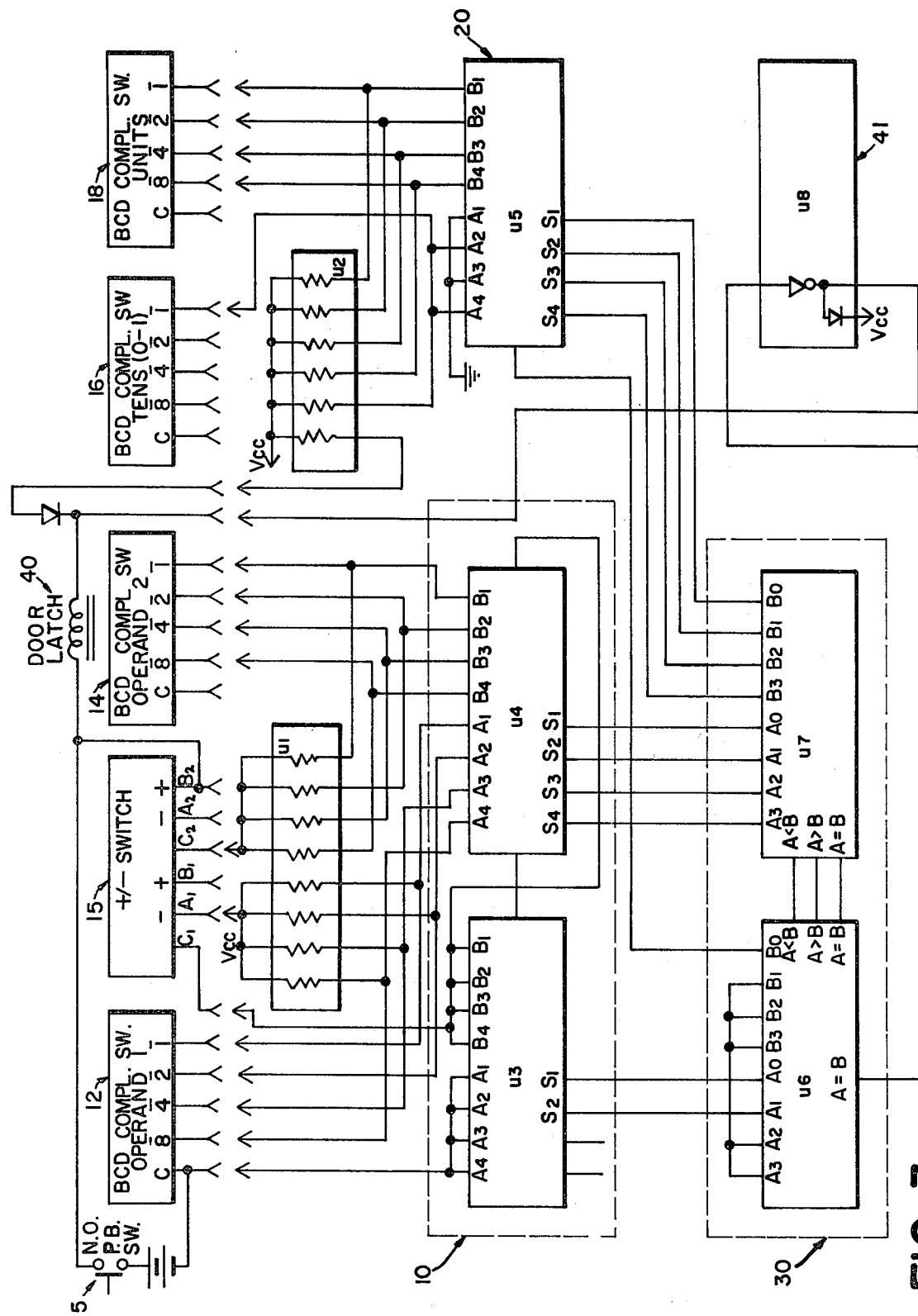
FIG. 3 is an electronic schematic diagram of the logic circuitry, shown in FIG. 2, within the device.

The details of the electronic circuit used in the logic shown in FIG. 2 is shown in FIG. 3. Integrated circuit elements and other components, well known to those skilled in the art, are utilized to provide the operation described above. As like numbers are used to describe like parts, the schematic diagram in FIG. 3 may be compared to the logic shown in FIG. 2. FIG. 3 illustrates how an actual circuit may be constructed using conventional logic components as building blocks. A six bit digital adder 10 is illustrated in FIG. 3. Integrated circuits $U_3$ and $U_4$ in adder 10 are connected in a fashion, as shown, to enable them to perform the addition or subtraction necessary. The interfacing of switches 12 and 14 with adder 10 is shown in greater detail in FIG. 3. Switch 15 is used to enter the operation sign for a particular equation. The connection as shown allows switch 15 to provide for a subtraction or addition function.

Digital adder 20 is shown as an integrated circuit $U_5$. Switches 16 and 18 function to program adder 20 through the connection as shown. In this configuration illustrated in FIG. 3, digital adder 20 functions with five bits to allow for number values up to nineteen.

The comparator 30 is constructed utilizing integrated circuits $U_6$ and $U_7$ connected in a fashion shown. This allows comparator 30 to compare outputs from adder 10 and adder 20. As explained previously, when the equation set out by switches 12, 15, 14, 16 and 18 is correct, the digital values in adders 10 and 20 will be equal. Comparator 30, upon determining this, provides an output which directs driver 41 to provide current to latch 40. If switch 5 is subsequently depressed, the current will have a complete path and latch 40 will energize, opening the vault door.

It is to be noted that in FIG. 3 the labeling of the components is in conformance with the standard nomenclature of digital logic design. Those familiar with electronic logic will be able to construct the device utilizing FIG. 3 without further information.

In operation it is contemplated that the teacher will place a reward of some type, such as candy, in the vault as an incentive. Of course, the mere opening of the vault is in itself an incentive. Generally, the teacher will place switch 15 in its add or subtract position and enter two numbers of the three possible. The student would then be instructed to correctly enter the third number, and would then follow the procedure previously described to accertain if it in fact was correct. The teacher may select other variations, such as entering the three numbers and asking the student to properly position the add/subtract switch 15.

With the bank vault opening only upon a correct mathematical expression, the student will be motivated to advance his knowledge of simple mathematics. It is to be noted that modifications can be made in the construction, material, arrangement and operation, and would still be within the scope of the invention as defined in the appended claims.

While the invention has been illustrated and disclosed with reference to a preferred embodiment, it is to be understood that various changes and modifications may be made to the invention without departing from the spirit of the invention.

What is claimed is:

1. An apparatus aid in the teaching of mathematics which comprises:
   a case;
   access means connected to said case for permitting access to the interior thereof;
   latch means operably connected to said case and to said access means, said latch means having a locked mode and an unlocked mode, said latch normally being in the locked mode;
   numerical input means arranged in a manner to simulate an algebraic expression; and
   operation means for accomplishing mathematical operations, operationally connected to said numerical input means which serves as input therefore, said operation means being adapted to generate an output being operationally connected to said latching means causing it to shift from its locked mode to its unlocked mode thereby permitting the student to have access to the interior of said case when the algebraic equation is mathematically correct.

2. The apparatus of claim 1 wherein said means for accomplishing mathematical operations is electronic.

3. The apparatus of claim 1 wherein said case is in the form of a bank vault.

4. The apparatus of claim 2 wherein said case is in the form of a bank vault.

5. The apparatus of claim 4 wherein said means for accomplishing mathematical operations comprising:
   two digital adders; and
   a comparator wherein said comparator is functionally connected to said digital adders.

6. The apparatus of claim 5 wherein said numerical input means comprises:
   a first number switch means for programming said first digital adder;
   a second number switch means for programming said first digital adder;
   a function switch means for programming said first digital adder; and
   an answer switch means for programming said second digital adder.

7. The apparatus of claim 6 further including a display means on said case which is operatively connected to the output of said comparator.

8. An apparatus of claim 7 wherein said comparator releases said latch when said first number switch means, said function switch means, said second number switch means and said answer switch means are all aligned on the said case in the order named herein, and an equal sign printed on the case between the second number switch means and the third number switch means so that they present an equation in a form which is algebraically correct.

9. An apparatus of claim 8 wherein the access means is in the form of a vault door in conjunction with said bank vault case.

10. An apparatus of claim 8 or claim 9 further including actuation means functioning to lock and unlock said latch means, said actuation means being operatively connected to said comparator.

* * * * *